United States Patent [19]

Chin et al.

[11] Patent Number: 5,418,004
[45] Date of Patent: May 23, 1995

[54] DEVICE AND METHOD FOR COATING A WEB WITH A LIQUID

[75] Inventors: Eiten Chin, Tochigi; Toshiharu Numata, Tokyo; Toshiki Takeuchi, Tokyo; Yutaka Nakama, Tokyo, all of Japan

[73] Assignee: Kao Corporation, Tokyo, Japan

[21] Appl. No.: 156,553

[22] Filed: Nov. 23, 1993

[30] Foreign Application Priority Data

Nov. 25, 1992 [JP] Japan ................... 4-336782

[51] Int. Cl.6 .................................. B05D 3/12
[52] U.S. Cl. ................... 427/128; 427/356; 118/410
[58] Field of Search .............. 427/356, 128; 118/410

[56] References Cited

U.S. PATENT DOCUMENTS

| | | | |
|---|---|---|---|
| 4,299,186 | 11/1981 | Pipkin et al. | 118/407 |
| 4,537,801 | 8/1985 | Takeda | 118/410 |
| 4,675,208 | 6/1987 | Kageyama et al. | 118/410 |
| 5,042,422 | 8/1991 | Tobisawa et al. | 118/410 |
| 5,105,760 | 4/1992 | Takahashi et al. | 118/410 |

*Primary Examiner*—Shrive Beck
*Assistant Examiner*—Katherine A. Bareford
*Attorney, Agent, or Firm*—Dvorak and Traub

[57] ABSTRACT

In an extrusion type coating device 10, an upstream lip 12 of a coating head 11 is provided with a chamfer with a slot side edge B thereof as a start point. A contact line L drawn from the upstream lip 12 to a downstream lip 13 defines an angle $\theta$ with a line segment OB with respect to a point O of contact between the contact line and the upstream lip 12 such that the angle $\theta$ is $0 < \theta < 45$ degrees.

9 Claims, 2 Drawing Sheets

DEVICE AND METHOD FOR COATING A WEB WITH A LIQUID

BACK GROUND OF THE INVENTION

1. Field of the invention

This invention relates to a device for and a method of applying a coating liquid on a web being fed. The web may be in the form of plastic films, paper sheets, cloth strips, metal sheets, etc. The coating liquid may be magnetic dispersoids, light-sensitive liquids, heat-sensitive dispersoids, adhesive liquids, etc. This coating process may be used to form magnetic recording media, photographic films, photo-sensitive paper, adhesive tapes, etc.

2. Description of the Background Art

Japanese Patent Laid-Open Publication No. S62-117666 discloses an extrusion type coating device. In this coating device, a coating liquid, which is extruded from a slot formed between an upstream and a downstream lip of a coating head, is coated on a web being fed past the two lips.

In the prior art extrusion type coating device, however, the scope of operating condition in which stable coating is possible, is very narrow.

Specifically, according to the results of research conducted by the inventor, a satisfactory coated film is obtainable when and only when an end of a coating liquid bead that is formed at the slot outlet of the coating head (i.e., a free gas/liquid interface on the upstream side of a coating section) is held fixed at the slot side edge of the upstream lip. If the bead end noted above is deviated forward or backward from the slot side edge of the upstream lip, longitudinal streaky irregularities or irregularities accompanied by air are generated on the coated film in the direction of the web feed.

For stable holding of the bead end at the slot side edge of the upstream lip, highly advanced operation control techniques are required, such as web feed techniques (concerning the feed speed of the web, tension therein, etc.), coating head setting techniques (concerning the extent to which the coating head is pushed beyond lines in contact with upstream and downstream guide rollers) and coating liquid feed techniques (concerning the pressure, under which the coating liquid is fed).

SUMMARY OF THE INVENTION

This is an object of the invention to permit stable coating and to ensure satisfactory coated film without use of highly advanced operation control techniques and in a wide scope of operation conditions.

According to the invention, there is provided a coating device, which comprises an extrusion type coating head having an upstream and a downstream lip defining a slot therebetween for coating liquid extruded from the slot on a web fed past lip faces of both the lips, the upstream lip of the coating head being provided with a chamfer having a slot side edge B as a starting point, a contact line L drawn from the upstream lip to the downstream lip defining an angle $\theta$ with a line segment OB with respect to a point O of contact between the contact line L and the upstream lip such that the angle $\theta$ is $0 < \theta < 45$ degrees.

Further according to the invention, there is provided the coating device wherein the web on which the coating liquid is coated, is supported on its back side by guide rollers provided on the inlet and outlet side, respectively, of the coating head.

Further according to the invention, there is provided the coating device wherein the web on which the coating liquid is coated, is supported on its back side by a rotary back-up roller.

Further according to the invention, there is provided the coating device wherein the upstream lip of the coating head is provided with a flat chamfer with the slot side edge B as a starting point.

Further according to the invention, there is provided the coating device wherein the upstream lip of the coating head is provided with a convex curved chamfer with the slot side edge B as a starting point.

Further according to the invention, there is provided the coating device wherein the upstream lip of the coating head is provided with a concave curved chamfer with the slot side edge B as a starting point.

Further according to the invention, there is provided the coating device wherein the web is made of plastic films, paper sheets, cloth strips, or metal sheets.

Further according to the invention, there is provided the coating device wherein the coating liquid is formed of magnetic dispersoids, light-sensitive liquids, heat sensitive dispersoids, or adhesive liquids.

Also, according to the invention, there is provided a coating method using the coating device wherein a bead of the coating liquid formed at the slot outlet of the coating head is held on the surface corresponding to the line segment OB as the coating liquid is coated on a web.

According to the invention, the following functions and effects are obtainable.

The surface corresponding to the line segment OB, which extends from the slot side edge B of the upstream lip in the coating head as a start point to the point O of contact between the line L drawn from the upstream lip to the downstream lip and the upstream lip as an end point, may be made to be a bead holding surface. Specifically, a substantially taper-like space is formed between the bead holding surface and the web to readily hold the bead in the scope of this space continuously.

Thus, the bead which is indispensable for prevention of the accompaniment of air, can be readily generated in a wide space between the contact line L and slot side edge B. It is thus possible to reliably prevent the accompaniment with air due to the failure of formation or rupture of the bead.

Excessive growth of bead can be prevented by the tapered narrow space between the contact line L and the neighborhood of the point O of contact, thus preventing excessive growth of bead toward the upstream side of the web. It is thus possible to avoid unstable flow of liquid due to otherwise possible excessive growth of bead and thus prevent longitudinal streaky irregularities or like defects.

With the effects discussed above, it is possible to obtain stable coating and to ensure satisfactory coated film without use of highly advanced operation control techniques and in a wide scope of operating conditions.

BRIEF DESCRIPTION OF THE DRAWINGS

The present invention will be more fully understood from the detailed description given below and from the accompanying drawings which should not be taken to be a limitation on the invention, but for explanation and understanding only.

In the drawings.

DESCRIPTION OF THE PREFERRED EMBODIMENT

Figure 1:
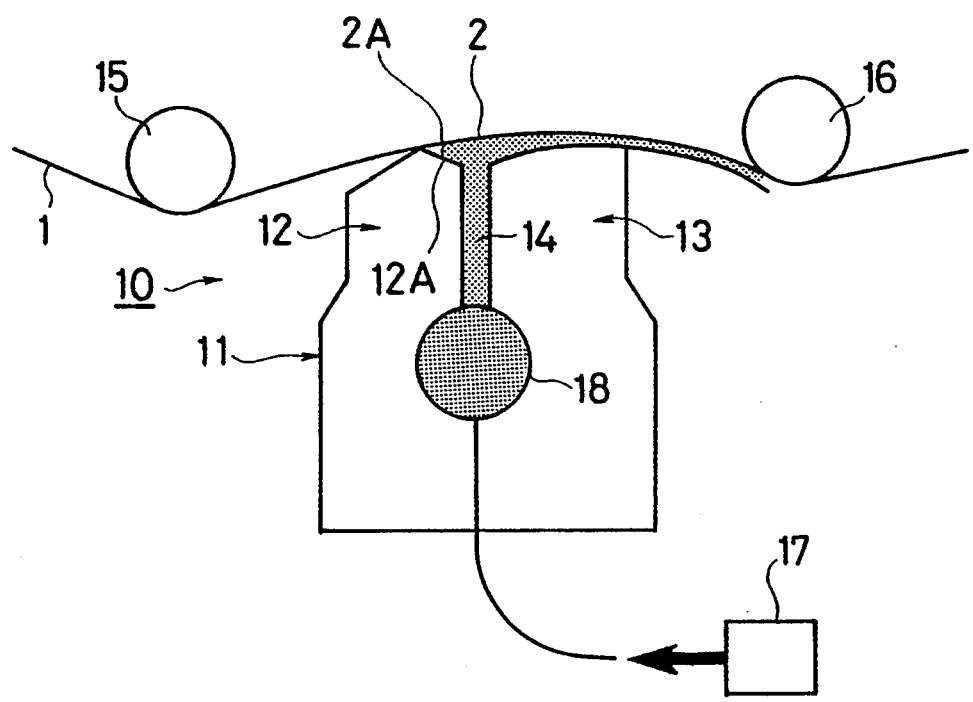
FIG. 1 is a schematic view (cross section) showing a first embodiment of the coating device according to the invention.

FIG. 1 shows a coating device 10. As shown, a coating liquid is extruded from a slot 14 defined between an upstream and a downstream lip 12 and 13 respectively of an extrusion type coating head 11, and it is coated on a web 1 being fed past the two lips 12 and 13.

In the coating device 10, the web 1 is not supported on its back side by any back-up roller or the like. Instead, the web 1 is supported by guide rollers 15 and 16 provided on the respective inlet and outlet sides of the coating head 11, and the web is pushed against the coating head 11 to coat it with the coating liquid.

The operation of the coating device 10 will now be described in detail.

The coating liquid fed out under pressure from the coating liquid source 17 is led to the chamber 18 in the coating head 11. The chamber 18 extends over the entire coating width of the coating head 11 and distributes the coating liquid in the coating width direction to provide for uniform coating in the coating width direction. The coating liquid supplied to the chamber 18 is led through the slot 14, i.e., a slit-like narrow path, provided between the upstream and downstream lips 12 and 13 to be discharged to the fed web 1. The slot 14 cooperates with the chamber 18 to squeeze and distribute the coating liquid in the coating width direction so as to provide for uniform coating in the coating width direction, while also providing a shearing force to the coating liquid. The coating liquid discharged from the slot 14, is coated on the web 1 in the space that is defined by the lips 12 and 13 and web 1. At this time, it is indispensable that a bead 2 is formed in this space. Failure of formation of the bead 2 or rupture thereof leads to accompaniment of air to produce fatal defects as the coating film. Further, excessive growth of the bead 2 to the upstream side of the web will lead to instability of liquid flow and produce longitudinal streaky irregularities or like defects.

Figure 3:
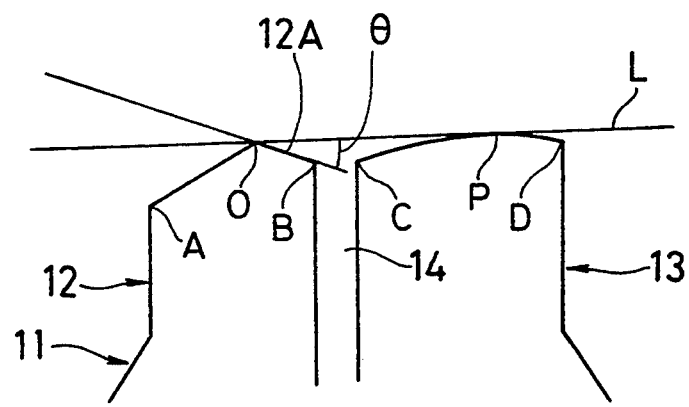
FIG. 3 is a schematic view (cross section) showing a first type of a coating head.

The coating head 11 used in the coating device 10 may be of a first type as shown in FIG. 3. Referring to FIG. 3, designated at A and B are the upstream and downstream edges of the upstream lip 12, C and D are the upstream and downstream edges of the downstream lip 13, at L line in contact with the upstream and downstream lips 12 and 13. O and P are points of contact between the line L with the upstream and downstream lips 12 and 13. In this first type of coating head 11, the upstream lip 12 is provided with a flat chamfer with the slot side edge B as a start point such that the angle $\theta$ between the line L and line segment OB is $0 < \theta < 45$ degrees.

Figure 4:
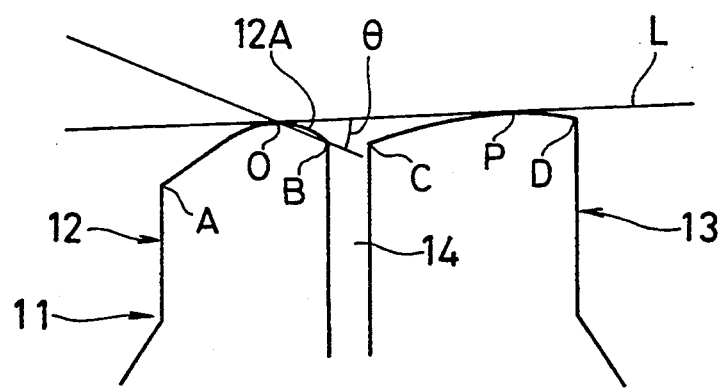
FIG. 4 is a schematic view (cross section) showing a second type of the coating head.

The coating head 11 in the coating device 10 may be of a second type as shown in FIG. 4. This second type of coating head 11 is different from the preceding first type of coating head 11 in that the upstream lip 12 is provided with a convex curved chamfer with the slot side edge B as a start point. In this coating head 11, again the angle $\theta$ between the line n and line segment OB is $0 < \theta < 45$ degrees.

Figure 5:
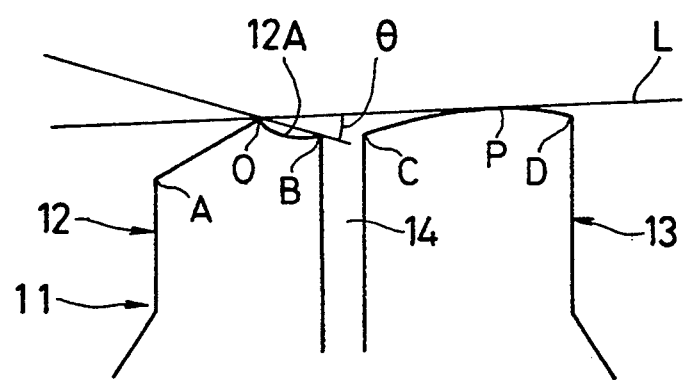
FIG. 5 is a schematic view (cross section) showing a third type of the coating head.

The coating head 11 of the coating device 10 may be of a third type as shown in FIG. 5. This third type of coating head 11 is different from the previous first type of coating head 11 in that the upstream lip 12 is provided with a concave curved chamfer with the slot side edge B as a start point. Again in this coating head 11, the angle $\theta$ between the line L and line segment OB is $0 < \theta < 45$ degrees.

The effects of the various embodiments will now be described.

The surface corresponding to the line segment OB, which extends from the slot side edge B of the upstream lip 12 in the coating head 11 as a start point to the point O of contact between the line L drawn from the upstream lip 12 to the downstream lip 13 and the upstream lip 12 as an end point, may be made to be a bead holding surface 12A. Specifically, a substantially taper-like space is formed between the bead holding surface and the web to readily hold the bead in the scope of this space continuously.

With variations of the operating conditions of the coating device 10, the end point 2A of the bead 2 (i.e., the end point in the direction opposite to the web feed direction) only reciprocates between the points O and B and does not get out of this line segment either forward or rearward but is held on the bead holding surface 12A. Thus, a stable coating state can be maintained while varying the operating conditions of the coating device 10.

Thus, the bead 2 which is indispensable for prevention of an air entrainment, can be readily generated in a wide space between the contact line L and slot side edge B. It is thus possible to reliably prevent the accompaniment of air due to the failure of formation or rupture of the bead.

Excessive growth of the bead 2 can be prevented by the narrow space between the contact line L and the neighborhood of the point O of contact, thus preventing excessive growth of the bead 2 toward the upstream side of the web. It is thus possible to avoid unstable flow of liquid due to otherwise possible excessive growth of the bead 2 and thus to prevent longitudinal streaky irregularities or like defects.

With the effects discussed above, it is possible to obtain stable coating and to ensure satisfactory coated film without use of highly advanced operation control techniques and in a wide scope of operating conditions.

Figure 2:
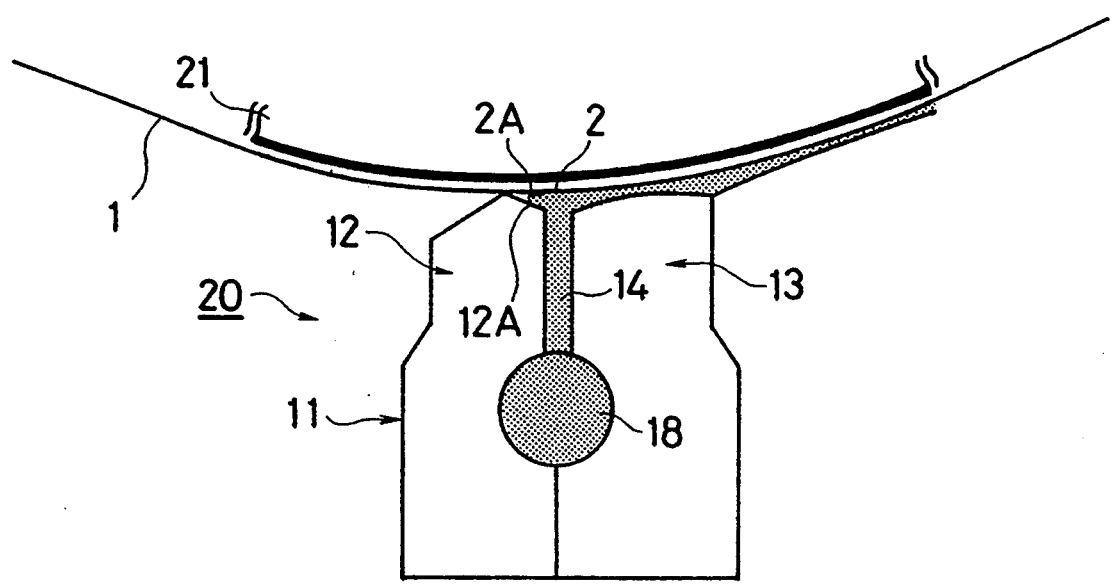
FIG. 2 is a schematic view (cross section) showing a second embodiment of the coating device according to the invention.

The embodiment of coating device 20 shown in FIG. 2 is different from the preceding coating device 10 only in that the back side of web 1, on which the coating liquid is coated by coating head 11, is supported by a rotary back-up roller 21. Again with this coating device 20, which may use any of the coating heads 11 shown in FIGS. 3 to 5, it is possible to obtain the same effects as noted above. That is, it is possible to obtain stable coating and to ensure satisfactory coated film without use of highly advanced operation control techniques and in wide range of operational conditions.

Following experiments were conducted in accordance with the invention.

A coating device as shown in FIG. 1 was used, and experimental results in Table 1 were obtained.

From Table 1, it will be seen that satisfactory coated film is obtainable by using the coating head according to the invention with $0<\theta<45$ degrees. The operational conditions that were selected are as follows.

(1) Coating liquid:

Magnetic dispersion (coating liquid A) showing thixotropic character of one poise at a shear rate of $1 \times 10^2$ sec.$^{-1}$.

Binder-diluted solution (coating liquid B) showing a Newtonian character of about 20 centipoise at a shear rate of 1 to $1 \times 10^3$ sec.$^{-1}$;

(2) Coating speed: 150 m/min.;

(3) Coating thickness: 1 μm dry;

(4) Web: 75 μm thick PET (polyethylene terephthalate) film;

(5) Angle $\theta$: $-10°$, $0°$, $5°$, $15°$, $30°$, $45°$, $60°$

As has been shown, according to the invention, it is possible to obtain stable coating and to ensure satisfactory coated film without use of highly advanced operation control techniques and in a wide scope of operational conditions.

Although the invention has been illustrated and described with respect to several exemplary embodiments, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the features set out in the appended claims.

TABLE 1

| Coating device | Coating area (Coating liquid A) | Coating area (Coating liquid B) |
|---|---|---|
| 1-st type | | |
| $\theta = -10°$ | ▲ | ▲ |
| $\theta = 0°$ | △ | △ |
| $\theta = 5°$ | ○ | ○ |
| $\theta = 15°$ | ○ | ○ |
| $\theta = 30°$ | ○ | ○ |
| $\theta = 45°$ | ▽ | ▼ |
| $\theta = 60°$ | ▼ | ▼ |
| 2-nd type | | |
| $\theta = -10°$ | ▲ | ▲ |
| $\theta = 0°$ | △ | △ |
| $\theta = 5°$ | ○ | ○ |
| $\theta = 15°$ | ○ | ○ |
| $\theta = 30°$ | ○ | ○ |
| $\theta = 45°$ | ○ | ▽ |
| $\theta = 60°$ | ▽ | ▼ |

○; Satisfactory
△; Partly defective (longitudinal streaky irregularities)
▽; Partly defective (accompaniment with air)
▲; Defective (longitudinal streaky irregularities)
▼; Defective (accompaniment with air)

What is claimed is:

1. A method involving the use of a coating device with an extrusion coating head having an upstream and downstream lip defining a slot therebetween for coating a coating liquid extruded from the slot on a web fed past lip faces of both of the lips;

the structure having the upstream lip of the coating head provided with a chamfer with a slot side edge B thereof as a start point; and a tangent line L drawn from the upstream lip to the downstream lip, the tangent line L touching the upstream lip at a point O and the downstream lip at a point P, said tangent line L defining an angle $\theta$ with a line segment OB with respect to the point O of contact between the tangent line L and the upstream lip such that the angle $\theta$ is $0<\theta<30$ degrees, the method comprising holding the bead of tile coating liquid formed at a slot outlet of the coating head on a surface corresponding to the line segment OB as the coating liquid is coated on a web.

2. A coating device comprising an extrusion coating head having an upstream and a downstream lip defining a slot therebetween for coating a liquid extruded from the slot on a web fed past lip faces of both the lips;

the upstream lip of the coating head being provided with a chamfer with a slot side edge B thereof as a start point;

a tangent line L drawn frown the upstream lip to the downstream lip, the tangent line L touching the upstream lip at a point O and the downstream lip at a point P, said tangent line L defining an angle $\theta$ with a line segment OB with respect to a point O of contact between the tangent line L and the upstream lip such that the angle $\theta$ is $0<\theta<30$.

3. The coating device as claimed in claim 2, comprising guide rollers provided on inlet and outlet sides, respectively, of the coating head for supporting said web.

4. The coating device as claimed in claim 2, comprising a rotary back-up roller for supporting said web.

5. The coating device as claimed in claim 2, wherein said upstream lip of the coating head is provided with a flat chamfer with the slot side edge B as a start point.

6. The coating device as claimed in claim 2, comprising a convex curved chamfer with the slot side edge B as a start point on the upstream lip of the coating head.

7. The coating device as claimed in claim 2, comprising a concave curved chamfer with the slot side edge B as a start point on the upstream lip of the coating head.

8. The coating device as claimed in claim 2, wherein the web is made up of one of plastic films, paper sheets, cloth strips, and metal sheets.

9. The coating device as claimed in claim 2, the coating liquid is made up of one of magnetic dispersoids, light-sensitive liquids, heat sensitive dispersoids, and adhesive liquids.

* * * * *